March 14, 1961 R. T. ADAMS 2,975,275

COMBINING SYSTEM FOR DIVERSITY COMMUNICATION SYSTEMS

Filed May 22, 1958

Inventor
ROBERT T. ADAMS
By Alfred C. Hill
Agent

United States Patent Office 2,975,275

Patented Mar. 14, 1961

2,975,275

COMBINING SYSTEM FOR DIVERSITY COMMUNICATION SYSTEMS

Robert T. Adams, Short Hills, N.J., assignor to International Telephone and Telegraph Corporation, Nutley, N.J., a corporation of Maryland Filed May 22, 1958, Ser. No. 737,172

12 Claims. (Cl. 250—20)

Figure 1:
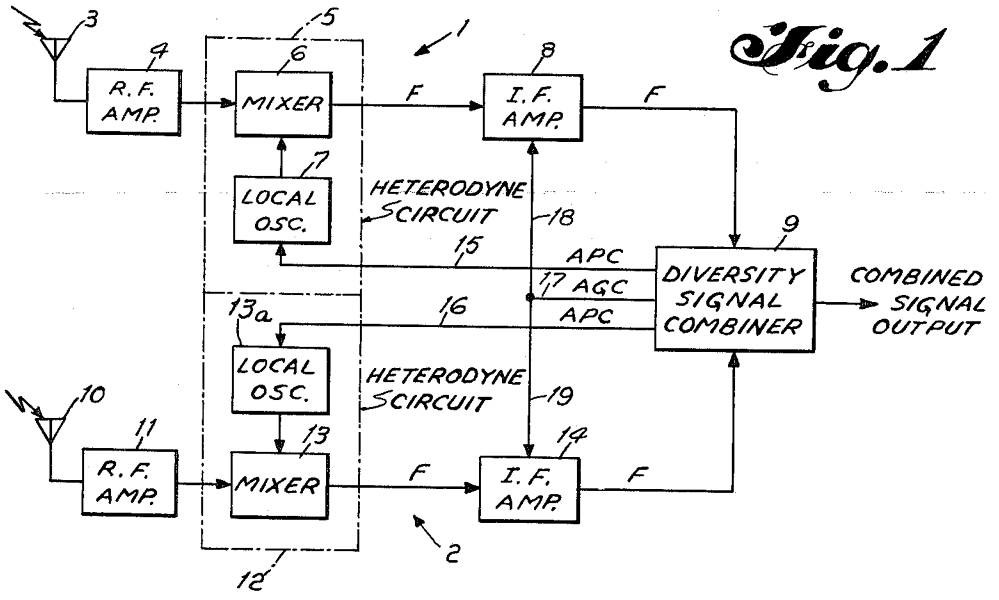

This invention relates to communication systems and more particularly to an improved signal combining system for communication systems employing diversity techniques.

Diversity techniques have been employed for a considerable length of time to overcome multipath or selective fading. The multipath fading of a signal may be termed the long term fading characteristic of the signal. With the advent of over-the-horizon or forward scattering communication systems, the signals being received still exhibit the long term fading and in addition there is present a short term variation in fading having a Rayleigh distribution of amplitudes resulting from the "scatter" nature of the over-the-horizon transmission. Thus, when employing diversity with over-the-horizon equipment, it is necessary to design the diversity components of such a system to handle the long and short term fading of the signals being received at a receiver. Hence, if two signals whose variations are unrelated, that is, with low correlation, are received and then combined in an appropriate manner, the fluctuations due to both the long and short term fading of the combination will be less than that of the separate signals. In general, different signals with suitable low correlation may be obtained by using separation in space or frequency. In general, antenna spacings of about 100 wavelengths and frequency separations of about 40 megacycles at 800 megacycles will provide the desired diversity action. Hence, diversity involves transmission of signals over independent paths and the recombination of these signals into one signal in the receiver.

In the past, the so-called base band combiner system has been employed to provide the combined signal at the receiver output derived from the two or more diversity signals. This type of signal combiner has three major shortcomings. First, it is complex, as it involves a complete receiver for each diversity signal and a complex combiner employing a large number of electron discharge tubes. Second, it has reliability problems not only on account of complexity, but because it is inherently not fail-safe, thus, requiring, for checking purposes, a monitoring system which in turn has a reliability problem. Third, its performance near threshold and with selective fading is impaired by use of one out-of-band noise-derived control voltage which in general is not representative of the condition of low channels. Further, the combiner tubes require closely equal inputs, a condition difficult to satisfy under selective fading conditions.

To overcome these difficulties, a type of combining hereinbelow described has been resorted to in the utilization of over-the-horizon communication equipment employing diversity techniques. The system has become known as an equal gain combining system. It offers theoretically performance within one decibel of that of the maximal-ratio combiner. The problem of providing instantaneously equal signals does not exist and the derivation of a suitable control voltage is facilitated in two important ways. First, an auxiliary noise-amplifier loop with fail-safe problems is not required beyond that required for AGC (automatic gain control) in the broadest sense, and second, and most significantly, the AGC control is derived from the composite, combined signal. This generation of AGC control is considerably smoother than that derived from the individual signals, according to the well-known diversity statistics, so that deep Rayleigh fades do not have to be followed, nor does the AGC control follow multipath nulls. The required range of AGC is thus considerably reduced.

The equal gain combiner, even where vacuum tubes are employed, is inherently fail-safe in that, if a tube or mixer crystal fails in any diversity channel, control is still retained by the strong diversity channels and the undesired noise in the fail diversity channel is not exaggerated. There is no requirement for special control characteristics to obtain ratio-squaring, but there is of course the problem of matching IF (intermediate frequency) amplifier gain characteristics. This is not serious but several precautionary measures can be taken to avoid trouble from this source. The AGC control voltage is applied to many IF stages to average the effects of tube differences. It has been found practical to match two 70 megacycle IF amplifiers within two decibels over a 50 decibel range. The equal gain combining arrangement anticipates and employs circuitry to enable the combining of the diversity signals at the IF frequency thereby enabling the utilization of a common subceiver for two or more diversity channels. To permit combining at the IF frequency, phase lock circuitry is employed. The automatic phase control voltage locks the two signals in the diversity channels in a predetermined phase relationship, such as 90 degrees out of phase. Note that combining is not based on any narrow band alone, but on cross correlation between two input spectra. Thus, if a selective fading minimum occurs in the signal frequency band, the region of maximum energy is automatically phased correctly for optimum utilization.

The receiver in an overall equal gain combining diversity system is believed to be simpler, more reliable, that is, fail-safe, and to perform better against multipath effects than the optimal gain base band receivers used previously.

An object of this invention is to provide a combining system for utilization with an equal gain combining diversity receiver which increases the reliability of such a receiver.

Another object of this invention is to provide a combining system for equal gain combining receivers which includes only passive elements.

Still another object of this invention is to provide a combining system for an equal gain combining diversity receiver which performs three operations, namely (1) combines the signals of the two or more diversity channels, (2) produces the automatic phase control voltage for control of the diversity channel signals for the required phase lock and (3) develops the automatic gain control voltage to control the gain of the IF amplifiers in each of the diversity signal channels.

A feature of this invention is a signal combining system comprising a hybrid circuit coupled to each of the diversity signal channels to combine the signals thereof substantially inphase and a phase detector responsive to the voltages developed in one portion of the hybrid circuit and to one of the signal sources to produce a control signal proportional to the phase difference between the signals of said sources to maintain the signals of the diversity channels in a predetermined phase relationship for the substantially inphase combining in the hybrid circuit.

Another feature of this invention is the provision of a single combining system comprising a hybrid circuit coupled to each of the diversity signal channels to combine the signals thereof substantially inphase and an automatic gain control circuit coupled to one portion of the hybrid circuit responsive to the voltage developed therein due to the combination of the signals of the diversity signal channels to produce an automatic gain control system to maintain approximately equal gain in the diversity channels while adjusting both gains to maintain a desired level for equal gain combining.

Still another feature of this invention is a signal combining system comprising a hybrid circuit coupled to each of the signal diversity channels to combine the signals thereof substantially inphase, a phase detector coupled to one portion of the hybrid circuit and responsive to the voltages developed therein and the signals of one of the diversity signal channels to produce a control signal proportional to the phase difference between the signals of the diversity signal channels to maintain the signals of the diversity signal channels in a predetermined phase relationship for the substantially inphase combining in the hybrid circuit and an automatic gain control detector coupled to another portion of said hybrid circuit and responsive to the combined signal voltages developed therein to produce an automatic gain control signal to maintain the gain in the diversity signal channels at a substantially equal gain while adjusting both gains to maintain a desired level for equal gain combining.

A further feature of this invention is the provision of a signal combining system to be utilized in an equal gain diversity combining receiver to provide a combined signal output, an automatic phase control signal to maintain the diversity signals of the diversity signal channels in a predetermined phase relationship and to develop an automatic gain control circuit to maintain the gain of the intermediate frequency amplifiers at a substantially equal gain while adjusting both gains to maintain a desired level for equal gain combining said combining system including only passive elements such as resistors, condensers, inductors and crystal rectifiers.

Still a further feature of this invention is the incorporation of only passive elements in a signal combining system to render the signal combiner substantially fail-safe.

Figure 2:
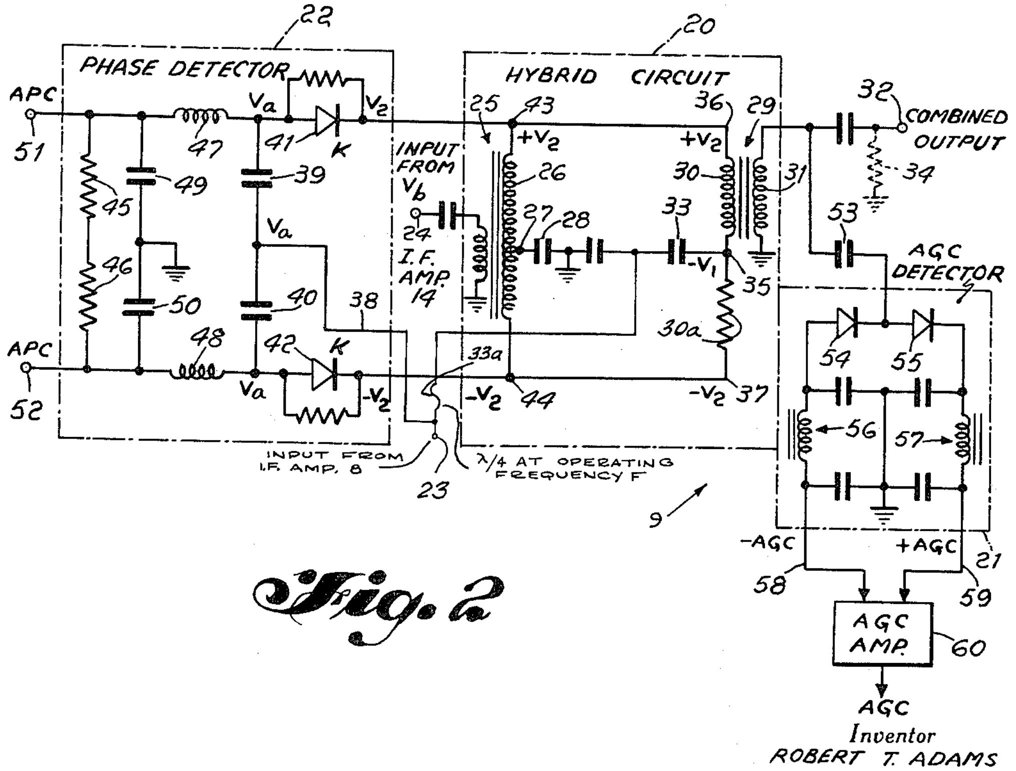

The above-mentioned and other features and objects of my invention will become more apparent by reference to the following description taken in conjunction with the accompanying drawings, in which:

Fig. 1 is a block diagram illustrating an equal gain combining diversity receiver utilizing the combining system of this invention; and Fig. 2 is a schematic diagram of the combining system of the receiver of Fig. 1.

Referring to Fig. 1, there is illustrated therein in block diagram form a diversity receiver employing the equal gain combining techniques hereinabove referred to. Basically, the diversity receiver in which the diversity signal combiner of this invention would be employed includes a first signal channel 1 and a second signal channel 2 having as components therein the necessary frequency selectors, heterodyning circuits and intermediate frequency amplifiers. In particular, diversity signal channel 1 includes an antenna 3 which receives a radio frequency signal from a distant transmitter. The output of antenna 3 is coupled to radio frequency amplifier 4 to assure proper frequency selection. The output of amplifier 4 is coupled to heterodyning circuit 5 which includes therein a mixer 6 which in conjunction with the output of local oscillator 7 reduces the radio frequency signal to the intermediate frequency signal having a frequency F. The output of heterodyning circuit 5, the output of mixer 6, is coupled to intermediate frequency amplifier 8 whose output is in turn coupled to the diversity signal combiner 9. The components of signal channel 2 are substantially identical to that of signal channel 1 and includes therein an antenna 10 to receive radio frequency signals from a distance transmitter. The induced signal on antenna 10 is coupled to a radio frequency amplifier 11 and hence, to a heterodyning circuit 12 including mixer 13 which beats the radio frequency signal down to the intermediate frequency signal having a frequency F through the cooperation with the frequency of the local oscillator *13a*. The output of mixer 13 is coupled to intermediate frequency amplifier 14 whose output in turn is coupled to diversity signal combiner 9.

Diversity signal combiner 9 operates on the outputs of intermediate frequency amplifiers 8 and 14 to produce a combined output for utilization in a subceiver to recover the intelligence carried on the combined diversity signals. The diversity signal combiner 9 also produces the automatic phase control voltage which is coupled over lines 15 and 16 to the local oscillators 7 and 14, respectively, to control the phase of the output signals of mixers 6 and 13 to assure that the signal outputs therefrom are in a predetermined phase relationship so that the signals applied to the diversity signal combiner 9 may be combined substantially inphase to produce the desired combined signal output. In addition, the diversity signal combiner 9 produces an automatic gain control signal which is coupled over line 17 and hence through lines 18 and 19 to intermediate frequency amplifiers 8 and 14 to provide substantially equal gain characteristics for these two amplifiers while adjusting the gain of amplifiers 8 and 14 to maintain a desired level for equal gain combining.

Before passing to the description of Fig. 2 wherein the detailed circuitry of diversity signal combiner 9 is described, it would be well to mention that the arrangement illustrated in Fig. 1 can be employed for space diversity techniques by positioning antennas 3 and 9 in a proper spaced relationship and by transmitting from a distance transmitter a radio frequency signal having a given frequency. In this arrangement radio frequency amplifiers 4 and 11 would be tuned to the given frequency. The local oscillators 7 and *13a* would be adjusted to be equal in frequency so that in the heterodyning process the output of mixers 6 and 13 respectively produce an intermediate frequency signal having a frequency F. This same arrangement of components could be employed for frequency diversity system by having the radio frequency amplifiers 4 and 11 adjusted to receive different radio frequency signals. That is, radio frequency amplifier 4 would be adjusted to receive a radio frequency signal $F_1$ while radio frequency amplifier 11 would be adjusted to pass a radio frequency signal $F_2$ with $F_1$ and $F_2$ being properly spaced to provide the desired diversity characteristics. With this type of arrangement, it will be necessary to adjust local oscillators 7 and *13a* in a manner relative to the signals passed from radio frequency amplifiers 4 and 11 to produce at the output of each of mixers 6 and 13 an intermediate frequency having a value of F.

Whether the diversity system is of the frequency or space type, the combining of the intermediate frequency signals would be accomplished in the same manner with the same circuit. It is of course required that the intermediate frequencies whether in a space or frequency diversity system be equal.

In either a space diversity or frequency diversity system, it is not necessary to employ two local oscillator signals to accomplish the desired heterodyning. This may be accomplished by using two local oscillators as depicted in Fig. 1. An alternative arrangement would be to employ a single local oscillator feeding two frequency multiplying chains which in the case of space diversity would produce the identical local oscillator frequency for combination with the radio frequency in mixers 6 and 13. In the case of frequency diversities, the frequency multiplier chains activated by the single local oscillator would be adjusted to provide the proper local oscillator frequency to produce the equal intermediate frequencies for coupling to intermediate frequency amplifiers 8 and 14. The multiplier chains in each of the heterodyning circuits would have to include therein a phase control element which would be capable of responding to the automatic phase control signals coupled from diversity combiner 9 to adjust the phase of the intermediate frequency signals so that they are in proper predetermined phase relationship to enable the combination of the intermediate frequencies of the two signal channels substantially inphase. Another alternative arrangement would be to employ a local oscillator which is fixed in frequency coupled to one diversity channel and a variable frequency local oscillator coupled to the other diversity channel. The automatic phase control signal would be coupled to the variable frequency local oscillator to adjust the phase of its output and hence the phase of its associated intermediate frequency signal to provide the desired phase relationship between the two intermediate frequency signals.

As is obvious from the foregoing, the diversity signal combiner 9 will function as hereinbelow described to produce the combined signal output, the automatic phase control signal necessary for the system in which it is incorporated and the automatic gain control signal required to provide substantially equal gains in amplifiers 8 and 14 provided that the two signals coupled to the diversity signal combiner 9 have the same frequency and are in a predetermined phase relationship.

The system described in Fig. 1 is a dual diversity arrangement employing a single diversity signal combiner. It is possible through proper multiplication of equipment, that is, employing a second arrangement as shown in Fig. 1 and passing the output therefrom to a third diversity combiner, to produce a diversity receiver system which is capable of four-fold diversity advantage. In such an arrangement, the diversity signal combiners would be the same as hereinbelow described with respect to Fig. 2. By employing the equipment of Fig. 1 N times, with the outputs of the combiners properly connected, it is possible to provide a system having N fold diversity advantages.

Referring more particularly to Fig. 2, the diversity signal combiner 9 is illustrated to be completely passive in nature, that is, there are no vacuum tubes or other pieces of equipment which are active in nature, and hence, the reliability of fail-safe nature of the combiner of an equal gain combining arrangement is increased over previously employed combiner arrangements including active elements such as vacuum tubes for an equal gain combining system.

The diversity signal combiner 9 consists of three main parts, the hybrid circuit 20, the AGC detector 21 and the phase detector 22. The hybrid circuit 20 is considered the heart of the combiner 9. Hybrid circuit 20 provides the inphase combining of the signals from IF amplifiers 8 and 14, provides in certain portions thereof the voltages to which automatic gain control detector 21 responds to produce the desired automatic gain control signal and provides in other portions thereof voltages to which phase detector 22 responds to produce the automatic phase control signal to maintain the intermediate frequency signals of the diversity channels in the desired phase relationship to enhance the inphase combining of these signals in hybrid circuit 20.

It is necessary to maintain a 90-degree phase difference between the outputs of amplifiers 8 and 14 to accomplish the inphase combining of these two signals in hybrid circuit 20. For purposes of explanation, it is assumed that the output of IF amplifier 8 is coupled to terminal 23 and the output of IF amplifier 14 is coupled to terminal 24. It is further assumed that the input to terminal 23 lags the input to terminal 24 by 90 degrees.

Hybrid circuit 20 includes transformer 25 whose secondary winding 26 is center tapped such as at 27. Center tap 27 is coupled by means of capacitor 28 to ground to establish the center tap 27 of secondary winding 26 at radio frequency (RF) reference potential, such as ground. Hybrid circuit 20 also includes transformer 29 whose primary 30 is in series relationship with resistor 30*a*. The opposite ends of the series combination of primary winding 30 and resistor 30*a* are coupled to opposite ends of secondary winding 26. The secondary winding 31 of transformer 29 couples the combined signals to the succeeding subceiver circuitry by means of terminal 32.

The action of hybrid circuit 20 in the combining operation thereof is as follows. The signal from amplifier 8 is coupled to terminal 23 and is displaced 90 degrees in phase from that signal coupled to terminal 24. The signal from amplifier 8 coupled to terminal 23 is coupled through a transmission line 33*a* having a length equal to one quarter wavelength at the operating frequency of the hybrid to shift the signal coupled to terminal 23 to 180 degrees out of phase with the signal coupled to terminal 24. After passing through the quarter wavelength line 33*a*, the signal is coupled by means of capacitor 33 to the junction of primary winding 30 and resistor 30*a*. With the proper termination at output terminal 32 as may be presented by the succeeding equipment and illustrated schematically by dotted resistor 34, the input impedance of transformer 29 can be made equal to the resistor value of resistor 30*a* and hence place the hybrid circuit 20 in a balanced condition. The current passing through resistor 30*a* and primary winding 30 enter the secondary winding 26 of transformer 25 in the opposite directions and therefore cancel in the secondary winding 26. This means that the ends of secondary winding 26 look like an RF ground. Therefore, the voltage from the input of terminal 23 appears only across the primary winding 30 and across resistor 30*a* and is not transmitted by transformer 25 to the input terminal 24.

Considering the input at terminal 24 which is 90 degrees away from the input of terminal 23. After passing through transformer 25 to the secondary 26, the voltage appears with plus or minus phase on the ends of the secondary 26 relative to the input at 24. The voltage on this secondary is connected to the primary winding 30 and resistor 30*a* in series. Because the circuit is balanced by the proper termination of output terminal 32, the voltage at the junction of primary winding 30 and resistor 30*a* is at the same potential as the center tap of the secondary winding 26 which is at ground potential. This means that no power from the input terminal 24 goes back into the input terminal 23. This holds true because the hybrid circuit is linear and bilateral.

Upon impressing both signals from IF amplifiers 8 and 14 simultaneously to their respective input terminals 23 and 24, combination takes place in hybrid circuit 20 as follows. The signal from terminal 23 is assumed to lag the signal at terminal 24 by 90 degrees. After the signal at terminal 23 passes through quarter wavelength line 33*a* the signal present at condenser 33 lags the signal at terminal 24 by 180 degrees and a voltage of $-V_1$ is applied at point 35 of transformer 29. The signal from terminal 24 is transformed by transformer 25 so as to apply a voltage $+V_2$ at point 36 of transformer 20 and a voltage of $-V_2$ at the lower end of resistor 30*a*, such as at point 37. The potential difference across winding 30 of transformer 29 is equal to $V_2-(-V_1)$, or $V_1+V_2$. The potential difference across 31 is $-V_2-(-V_1)$, or $V_1-V_2$, thus tending to cancel. The voltage transmitted to the output terminal 32 is $$\sqrt{2}\frac{(V_1+V_2)}{2}$$

or 0.7 of the sum of $V_1$ and $V_2$. Maximum output at terminal 32 occurs when the inputs at terminals 23 and 24 are exactly in proper phase and exactly equal in amplitude.

Phase detector 22 in cooperative structural relationship with hybrid circuit 20 controls the relative phase of the local oscillators 7 and 13*a* or in a more general sense the phase of the local oscillator frequency coupled to mixers 6 and 13 to correct and maintain the predetermined phase relationship of the IF signals so as to obtain proper addition in the combiner or hybrid circuit 20, the predetermined phase relationship being a 90-degree phase difference between the signals on the two different signal channels. This is done by means of a frequency control voltage fed to the oscillators or heterodyning circuits, causing each to gain or lose phase (frequency equal rate of change of phase) with respect to the other local oscillator or heterodyning circuit. The control voltage is obtained in the combiner 9 by phase comparison of the signals in the combiner itself.

The action of obtaining the phase control voltage is as follows. The voltage at terminal 23, $V_a$, is fed through conductor 38 and hence through condensers 39 and 40 to appear at the anode end of each of the crystal diodes 41 and 42. The voltage at terminal 24 is fed through the push-pull transformer 25 to derive two voltages: $V_2$ which appears at one end of secondary winding 26, such as point 43, and hence at the cathode of crystal rectifier 41, and $-V_2$ at the other end of winding 26, such as at point 44, and hence at the cathode of crystal rectifier 42. Across crystal rectifier 41 appears the difference in voltages $V_a-V_2$ and across crystal rectifier 42 appears the difference in voltages $V_a-(V_2)$ or $V_a+V_2$. These sum and difference voltages are detected by crystals 41 and 42 and the D.C. (direct current) circuit is arranged so as to subtract the resulting D.C. outputs. The D.C. circuit includes resistors 45 and 46. Inductors 47 and 48 and condensers 49 and 50 functioning as filters to remove from the D.C. circuit any RF potential that may be present at the anode of crystals 41 and 42. Any inequality in the difference and sum voltages across diodes 41 and 42 appears between the APC terminals 51 and 52. If $V_a$ lags $V_2$ by less than 90 degrees, the magnitude of $V_a+V_2$ will exceed that of $V_a-V_2$ and if $V_a$ lags $V_2$ by more than 90 degrees, the magnitude of $V_a-V_2$ will be greater than that of $V_a+V_2$. At exactly 90 degrees, $V_a+V_2=V_a-V_2$. A positive or negative frequency control or phase control voltage is obtained between terminals 51 and 52 if $V_a$ is more or less than 90 degrees from $V_2$ and the local oscillators are driven by this phase control voltage to maintain $V_a$ and $V_2$ at a 90-degree phase angle which will mean that $V_a$, the output of amplifier 8 and $V_b$, the output of amplifier 14, are in the desired predetermined phase relationship of 90 degrees. It will be observed that to obtain the required phase relationships in the combiner circuits, $V_a$ and $V_b$ are maintained at 90-degree phase relationships for application to the hybrid circuit. A quarter wavelength line is inserted in the terminal connection of $V_a$ so that $V_1$ and $V_2$ are maintained at 180 degrees and further to provide that $V_1$ lags $V_a$ by 90 degrees and the phase detector is connected to the hybrid to maintain $V_a$ lagging $V_2$ by 90 degrees.

It will be observed that the phase detector samples the inputs at terminals 24 and 23 by taking directly the signal at terminal 23 and the voltages developed on each end of the secondary 26 of transformer 25 to obtain a voltage which goes plus and minus about a center corresponding to 90 degrees difference between the signals at input terminals 23 and 24. The input at terminal 23 is shifted 90 degrees so that the two signals, one signal at point 35 and the other signal at terminal 24 are 180 degrees out of phase so that a proper combination of the two signals inphase is accomplished in the hybrid transformer which is in turn connected to the output terminal 32.

At the output transformer 29 the combined signal level is monitored by the AGC detector 21. The combined signals at secondary winding 31 are coupled through condenser 53 which is a D.C. isolating condenser. The intermediate frequency signal is peak detected in a voltage doubling circuit including rectifiers 54 and 55 which after filtering in filters 56 and 57 results in a D.C. potential appearing on conductors 58 and 59. The D.C. potential on line 58 is a minus value and the D.C. potential on line 59 is a positive value, both of these D.C. voltages being off of ground. The outputs of this AGC detector 21 are coupled to AGC amplifier 60 which in accordance with the magnitude of the detected peaks of the combined signal being coupled to the output terminal 32 produces an AGC voltage which is coupled back to intermediate frequency amplifiers 8 and 14 to maintain substantially equal gain characteristics in these two amplifier circuits while adjusting the gain of these two amplifier circuits to maintain a desired level for equal gain combining. It hence will be observed that the AGC detector operates on the combined signal output of the hybrid circuit 20, such as to provide the substantially equal gain characteristics in amplifier 8.

In summary, it may be stated that the hybrid circuit 20 operates to combine two signals applied thereto having a predetermined phase relationship substantially inphase at the output thereof. The phase detector 22 is cooperatively coupled to a portion of hybrid circuit 20 such that the voltage appearing across this portion of the hybrid circuit compared with one of the signals coupled to the hybrid circuit produces a control signal to correct the phase of the signals being coupled to the hybrid circuit to assure that they are combined inphase. In addition to another portion of the hybrid circuit is connected in a cooperative relationship the AGC detector so that the gain of the intermediate frequency amplifiers can be controlled by the developed AGC signal to assure that the signals coupled to the hybrid have substantially the same amplitude. Hence, with this arrangement the diversity signal combiner provides the necessary control signals to assure that the signals coupled to the hybrid combining arrangement are in proper phase relationship and substantially equal in amplitude to provide the maximum combined output for utilization in subsequent circuits.

While I have described above the principles of my invention in connection with specific apparatus, it is to be clearly understood that this description is made only by way of example and not as a limitation to the scope of my invention as set forth in the objects thereof and in the accompanying claims.

I claim:

1. A signal combining system comprising a first source of signals, a second source of signals, a hybrid circuit comprising a first winding, means to couple the center of said first winding to a radio frequency reference potential, a second winding, means to couple one end of said second winding to one end of said first winding, a resistor having one end thereof coupled to the other end of said second winding, and means coupling the other end of said resistor to the other end of said first winding, means coupling said first source to said first winding, means coupling said second source to the junction of said second winding and said resistor, means coupled to said second winding to remove therefrom the combined signals of said first and second sources, means responsive to the voltage at each end of said first winding and the voltage of said second source to produce a control signal related to the phase difference between the signals of said first and second sources and means to couple said control signal to at least one of said first and second sources to maintain the signals of said first and second sources in a predetermined phase relationship for substantially inphase combining in said hybrid circuit.

2. A signal combining system comprising a first source of signals, a second source of signals, a hybrid circuit comprising a first winding, means to couple the center of said first winding to a radio frequency reference potential, a second winding, means to couple one end of said second winding to one end of said first winding, a resistor having one end thereof coupled to the other end of said second winding, and means coupling the other end of said resistor to the other end of said first winding, means coupling said first source to said first winding, means coupling said second source to the junction of said second winding and said resistor, means coupled to said second winding to remove therefrom the combined signals of said first and second sources, means responsive to the voltage at each end of said first winding and the voltage of said second source to produce a control signal related to the phase difference between the signals of said first and second sources, means to couple said control signal to at least one of said first and second sources to maintain the signals of said first and second sources in a predetermined phase relationship for substantially inphase combining in said hybrid circuit, means responsive to the combined signals of said first and second sources to produce a control voltage proportional to the amplitude of the combined signals, and means to couple said control voltage to each of said sources to control the amplitude of the signals of said sources.

3. A signal combining system comprising a first source of signals, a second source of signals, a hybrid circuit comprising a first winding, means to couple the center of said first winding to a radio frequency reference potential, a second winding, means to couple one end of said second winding to one end of said first winding, a resistor having one end thereof coupled to the other end of said second winding, and means coupling the other end of said resistor to the other end of said first winding, means coupling said first source to said first winding, means coupling said second source to the junction of said second winding and said resistor for the inphase combining of the signals of said first and second sources in said second winding, means responsive to the voltage in said second winding to produce a control signal related to the amplitude of the combined signals and means to couple said control signal to each of said signal sources to control the amplitude of the signals of said sources.

4. A signal combining system comprising a first signal source having signals of a given frequency, a second signal source having signals of said given frequency and displaced in phase by 90 degrees from the signals of said first source, a hybrid circuit including a first winding, means to couple the center of said first winding to a radio frequency reference potential, a series circuit including a second winding and a resistor, the input impedance of said second winding and the resistance of said resistor being equal, and means coupling the ends of said series circuit to the ends of said first winding, means to inductively couple the signals of said first source to said first winding, a transmission line section having a length of one quarter wavelength at said given frequency coupling the signals of said second source to the junction of said resistor and said second winding, an output terminal and means to inductively couple the potential difference across said second winding to said output terminal.

5. A signal combining system comprising a first signal source having signals of a given frequency, a second signal source having signals of said given frequency and displaced in phase 90 degrees from the signals of said first source, a hybrid circuit including a first winding, means to couple the center of said first winding to a radio frequency reference potential, a series circuit including a second winding and a resistor, the input impedance of said second winding and the resistance of said resistor being equal, and means coupling the ends of said series circuit to the ends of said first winding, means to inductively couple the signals of said first source of said first winding, a transmission line section having a length of one quarter wavelength at said given frequency coupling the signals of said second source to the junction of said resistor and said second winding, an output terminal and means to inductively couple the potential difference across said second winding to said output terminal, a first rectifier having its cathode coupled to one end of said first winding, a second rectifier having its cathode coupled to the other end of said first winding, means coupling the signal of said second source to the anode of each of said rectifiers, resistive means coupled to the anode of each of said rectifiers to subtract the resulting outputs from said rectifiers to produce a control voltage related to the phase difference between the signals of said first and second sources, and means to couple said control signal to at least one of said first and second sources to maintain the signals of said first and second sources in a predetermined phase relationship for substantially inphase combining in said hybrid circuit.

6. A signal combining system comprising a first signal source having signals of a given frequency, a second signal source having signals of said given frequency and displaced in phase by 90 degrees from the signals of said first source, a hybrid circuit including a first winding, means to couple the center of said first winding to a radio frequency reference potential, a series circuit including a second winding and a resistor, the input impedance of said second winding and a resistance of said resistor being equal, and means coupling the ends of said series circuit to the ends of said first winding, means to inductively couple the signals of said first source to said first winding, a transmission line section having a length of one-quarter wavelength at said given frequency coupling the signals of said second source to the junction of said resistor and said second winding, an output terminal, means to inductively couple the potential difference across said second winding to said output terminal, a peak detector coupled to said last mentioned means to inductively couple to produce a control signal proportional to the amplitude of the potential difference across said second winding, and means coupling said control signal to each of said sources to control the amplitude of the signals of said sources.

7. A signal combining system comprising a first signal source having signals of a given frequency, a second signal source having signals of said given frequency and displaced in phase by 90 degrees from the signals from said first source, a hybrid circuit including a first winding, means to couple the center of said first winding to a radio frequency reference potential, a series circuit including a second winding and a resistor, the input impedance of said second winding and the resistance of said resistor being equal, and means coupling the ends of said series circuit to the ends of said first winding, means to inductively couple the signals of said first source to said first winding, a transmission line section having a length of one-quarter wavelength at said given frequency coupling the signals of said second source to the junction of said resistor and said second winding, an output terminal, means to inductively couple the potential difference across said second winding to said output terminal, a peak detector coupled to said last mentioned means to inductively couple to produce a control voltage proportional to the amplitude of the potential difference across said second winding, means coupling said control voltage to each of said sources to control the amplitude of the signals of said sources, a first rectifier having its cathode coupled to one end of said first winding, a second rectifier having its cathode coupled to the other end of said first winding, means coupling the signals of said second source to the anode of each of said rectifiers, resistive means coupled between the anodes of said first and second rectifiers to produce a control signal related to the phase difference between the signals of said first and second sources, and means to couple said control signal to at least one of said first and second sources to maintain the signals of said first and second sources in a predetermined phase relationship for substantially inphase combining in said hybrid circuit.

8. A signal combining system comprising a first source of signals, a second source of signals, a hybrid circuit, means coupling one of said sources directly to said hybrid circuit, means coupling the other of said sources to said hybrid circuit to enable the combining of the signals of said sources substantially inphase in said hybrid circuit, a phase detector responsive to the voltages developed in one portion of said hybrid circuit and the signals of a selected one of said signal sources to produce a control signal proportional to the phase difference between the signals of said sources, said phase detector being directly coupled to said one portion and to said selected one of said sources, and means to couple said control signal to at least one of said sources to maintain the signals of said first and second sources in a predetermined phase relationship for the substantially inphase combining in said hybrid circuit.

9. A signal combining system comprising a first source of signals, a second source of signals, a hybrid circuit including a first portion and a second portion, means coupling one of said sources directly to one of said portions, means coupling the other of said sources to the other of said portions, a phase detector including said one of said portions, means coupling said other of said sources directly to said phase detector, said phase detector being responsive to the voltages developed in said one portion and the voltage of said other of said signal sources to produce a control signal proportional to the phase difference between the signals of said sources, and means to couple said control signal to at least one of said sources to maintain the signals of said first and second sources in a predetermined phase relationship for the substantially inphase combining in said hybrid circuit.

10. A signal combining system comprising a first source of signals, a second source of signals, a hybrid circuit including a first portion and a second portion, means coupling one of said sources directly to one of said portions, means coupling the other of said sources to the other of said portions to enable the combining of the signals of said sources substantially inphase in said hybrid circuit, a phase detector coupled directly to said one portion and to said other source, said phase detector being responsive to the voltages developed in said one portion and the voltage of said other signal source to produce a control signal proportional to the phase difference between the signals of said sources, and means to couple said control signal to at least one of said sources to maintain the signals of said first and second sources in a predetermined phase relationship for the substantially inphase combining in said hybrid circuit.

11. A signal combining system comprising a first source of signals, a second source of signals, a hybrid circuit including a first portion and a second portion, means coupling one of said sources directly to one of said portions, means coupling the other of said sources to the other of said portions to enable the combining of the signals of said sources substantially inphase in said hybrid circuit, a phase detector including only passive circuit elements and said one portion, means coupling said other of said signal sources to said phase detector, said phase detector being responsive to the voltages developed in said one portion and the voltage of said other of said signal sources to produce a control signal proportional to the phase difference between the signals of said cources, and means to couple said control signal to at least one of said sources to maintain the signals of said first and second sources in a predetermined phase relationship for the substantially inphase combining in said hybrid circuit.

12. A signal combining system comprising a first source of signals, a second source of signals, a hybrid circuit including a first portion and a second portion to combine the signals of said sources substantially inphase, means coupling one of said sources directly to one of said portions, means coupling the other of said sources to the other of said portions to enable the substantially inphase combining in said hybrid circuit, a phase detector coupled directly to said one of said portions and said other of said signal sources, said phase detector being responsive to the voltages developed in said one of said portions and the voltage of said other of said signal sources to produce a control signal proportional to the phase diffierence between the signals of said sources, means to couple said control signal to at least one of said sources to maintain the signals of said first and second sources in a predetermined phase relationship for the substantially inphase combining in said hybrid circuit, an automatic gain control detector coupled to the output of said hybrid circuit responsive to the amplitude of the combined signals to produce an automatic gain control signal, and means coupling said automatic gain control signal to each of said sources to control the amplitude of the signals of said sources.

References Cited in the file of this patent

UNITED STATES PATENTS

| | | |
|---|---|---|
| 2,042,831 | Crosby | June 2, 1936 |
| 2,089,409 | Ohl | Aug. 10, 1937 |
| 2,683,213 | Earp | July 6, 1954 |
| 2,713,606 | Szikali | July 19, 1955 |